United States Patent
James et al.

(10) Patent No.: US 9,703,337 B2
(45) Date of Patent: Jul. 11, 2017

(54) THERMAL MODEL OPTIMISATION

(71) Applicant: Control Techniques Limited, Newtown (GB)

(72) Inventors: Gareth Christopher James, Newtown (GB); Robert Gwyn Williams, Newtown (GB); Nathan Downes, Newtown (GB)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 947 days.

(21) Appl. No.: 13/886,749

(22) Filed: May 3, 2013

(65) Prior Publication Data
US 2013/0317664 A1 Nov. 28, 2013

(30) Foreign Application Priority Data

May 4, 2012 (GB) .................................. 1207915.8
Oct. 31, 2012 (GB) .................................. 1219574.9

(51) Int. Cl.
*G06F 19/00* (2011.01)
*G06F 1/20* (2006.01)
*H02P 23/14* (2006.01)
*H02P 29/68* (2016.01)
(Continued)

(52) U.S. Cl.
CPC ............. *G06F 1/206* (2013.01); *H02P 23/14* (2013.01); *H02P 29/68* (2016.02); *H02M 5/458* (2013.01); *H02M 2001/327* (2013.01)

(58) Field of Classification Search
CPC ...... G06F 1/206; H02P 29/0088; H02P 23/14; H02M 2001/327; H02M 5/458
See application file for complete search history.

(56) References Cited

U.S. PATENT DOCUMENTS 5,912,813 A * 6/1999 Kerkman .......... H02M 7/53875
                                                    318/811
6,112,808 A * 9/2000 Isted ................ E21B 28/00
                                                    166/248
(Continued)

FOREIGN PATENT DOCUMENTS

WO      2010/114995      10/2010

OTHER PUBLICATIONS

Sang-Bin Lee, Thomas G. Habetler, Sep. 2003, IEEE, vol. 39, No. 5, pp. 1323-1332.*

Primary Examiner — Michael D Masinick
(74) Attorney, Agent, or Firm — Harness, Dickey & Pierce, P.L.C.

(57) ABSTRACT

A method for controlling the temperature of a component is disclosed. The component is part of a drive configured to drive an electrical machine via an electrically conductive member. The method comprises determining a value of an attribute of the electrically conductive member; configuring a model to calculate the temperature of the component, the model being configured based on the determined value of the attribute of the electrically conductive member; using the model to calculate the temperature of the component; and if the calculated temperature of the component does not meet a predetermined temperature condition, issuing a command to control the operation of the drive such that the temperature of the component is changed to meet the predetermined temperature condition.

28 Claims, 4 Drawing Sheets

Figure 1:
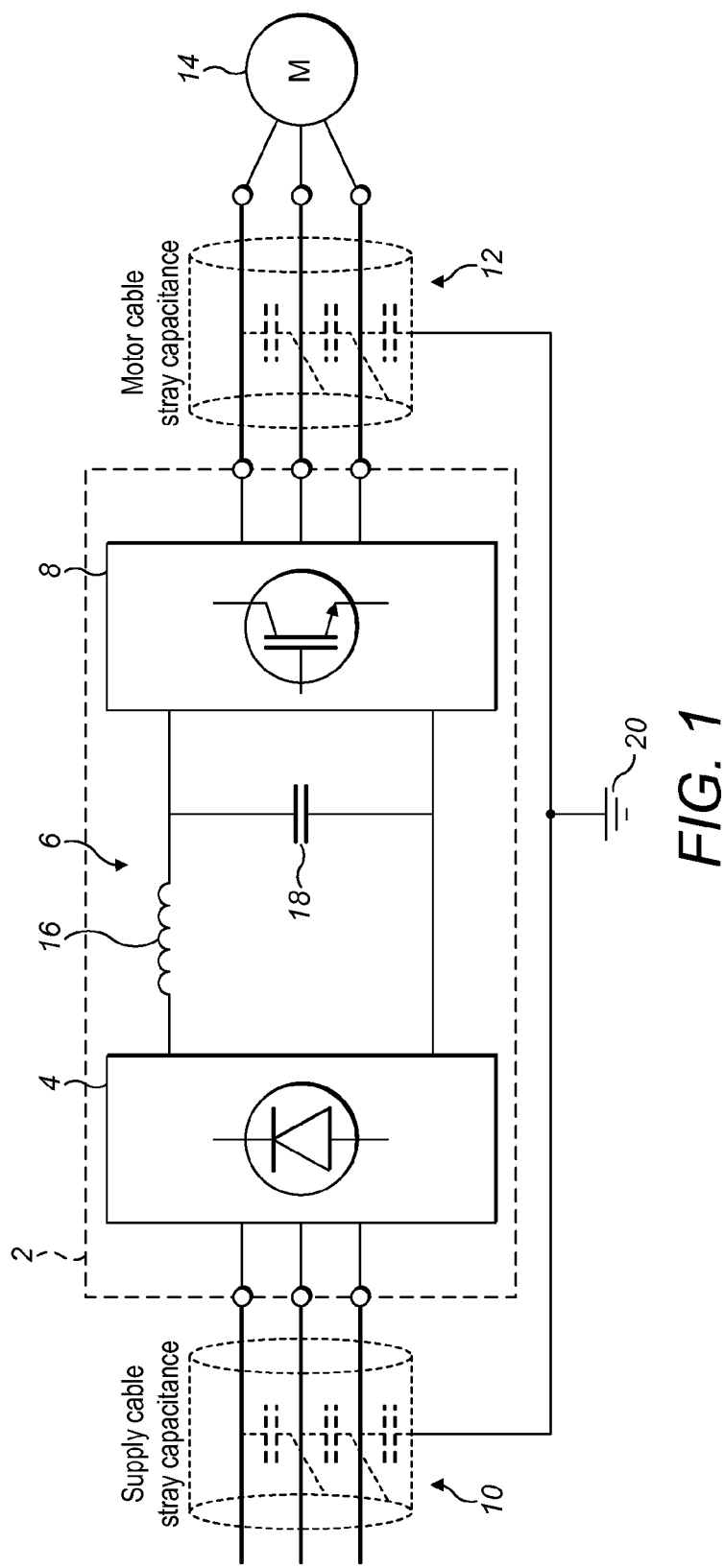

(51) Int. Cl.
   *H02M 5/458*    (2006.01)
   *H02M 1/32*     (2007.01)

(56) References Cited

U.S. PATENT DOCUMENTS

| | | | | |
|---|---|---|---|---|
| 6,496,916 | B1* | 12/2002 | Fadavi-Ardekani | G11C 8/12 710/40 |
| 6,573,733 | B2* | 6/2003 | Bohley | G01B 7/02 324/519 |
| 2003/0016001 | A1* | 1/2003 | Borup | H02J 3/18 323/364 |
| 2004/0124802 | A1* | 7/2004 | Brogardh | B25J 9/1664 318/568.22 |
| 2005/0174820 | A1* | 8/2005 | Mutoh | H02M 1/44 363/144 |
| 2008/0073978 | A1* | 3/2008 | Ollila | H02M 7/53873 307/82 |
| 2008/0170421 | A1* | 7/2008 | Kishimoto | H02H 7/0844 363/55 |
| 2010/0080024 | A1* | 4/2010 | Wei | H02M 1/32 363/74 |
| 2013/0308351 | A1* | 11/2013 | MacLennan | H02M 1/12 363/34 |
| 2013/0317664 | A1* | 11/2013 | James | H02P 23/14 700/299 |
| 2015/0377717 | A1* | 12/2015 | Rollin | G01K 7/01 318/400.26 |

* cited by examiner

THERMAL MODEL OPTIMISATION

CROSS-REFERENCE TO RELATED APPLICATIONS

This application claims the benefit and priority of Great Britain Patent Application No. 1207915.8 filed May 4, 2012, and Great Britain Patent Application No. 1219574.9 filed Oct. 31, 2012. The entire disclosures of each of the above applications are incorporated herein by reference.

FIELD

This invention relates to electrical models, in particular to their application in drives configured to drive a motor via a cable.

BACKGROUND

Drives (also known as "drive units"), which are used to control electric motors via an electrically conductive cable, often have their own power rating, which sets a maximum allowable power for the drive. The power rating of drives is set such that, under certain conditions, the temperature of an inverter in the drive will not exceed a predetermined value. This is to ensure that the operating conditions of the drive remain safe. The effect of using a power cable of significant length is that it has the characteristics of a transmission line. It is well known that a badly terminated transmission line will cause current reflections. The screened power cables used with drives have an inherent capacitance. When a current is output from the drive and passes through the cable, some of this current is used to charge the cable, rather than reaching the desired destination of the motor. In general, the reflected cable charging current seen by the components of the inverter within a drive and its effect on the power loss of these components varies with the length of the cable.

When a drive is connected to (e.g.) a motor using screened cables, the cable charging current is added to the output current during the switching event. As the length of the cable is increased, the time taken for the reflected charging current to reach the drive increases. The effect of the cable length on the switching loss is at a maximum when reflection occurs after the switching event has finished. At every switching edge, the capacitance absorbs charge, which is subsequently discharged on the falling edge. This leads to a capacitive high frequency current which must be supported by the inverter output. The charging current increases with increasing switching frequency. This can be a particular problem for small drives, for which the cable charging currents may be significant compared with the drive's current rating. If excessive, the cable charging current can result in a drive trip in which the inverter is disabled. As a result, the power ratings set for drives can conventionally be quite restrictive, to avoid tripping or the creation of unsafe operating conditions.

Conventionally, the calculation of the power rating for a drive is based on the cable being a predetermined length. Each drive also has a maximum cable length rating, with potentially unsafe conditions being created if the drive is used with a longer length of cable. The power rating of drives is set according to this predetermined maximum allowable cable length, such that unsafe conditions will not be created when cables of this length or shorter are used. In particular, the temperature of the inverter in the drive will not exceed a predetermined value.

It has been appreciated by the inventor that, with the conventional power rating system as described above, the predetermined power rating (and other ratings for the drive) can be overly restrictive when a motor cable is used having properties different from those of the cable used in determining the ratings of the drive. An example of this situation is when a shorter cable than the maximum cable length of the rating is used.

SUMMARY

An invention is set out in each of the independent claims. Optional features are set out in the dependent claims.

According to an aspect, there is provided a method for controlling the temperature of a component, the component being part of a drive configured to drive an electrical machine via an electrically conductive member, the method comprising:

determining a value of an attribute of the electrically conductive member;

configuring a model to calculate the temperature of the component, the model being configured based on the determined value of the attribute of the electrically conductive member;

using the model to calculate the temperature of the component; and if the calculated temperature of the component does not meet a predetermined temperature condition, issuing a command to control the operation of the drive such that the temperature of the component is changed to meet the predetermined temperature condition.

According to an aspect, there is provided a drive configured to control the temperature of a component, the component being part of the drive, the drive being configured to drive an electrical machine via an electrically conductive member, the drive being configured to:

determine a value of an attribute of the electrically conductive member;

configure a model to calculate the temperature of the component, the model being configured based on the determined value of the attribute of the electrically conductive member;

use the model to calculate the temperature of the component; and if the calculated temperature of the component does not meet a predetermined temperature condition, issue a command to control the operation of the drive such that the temperature of the component is changed to meet the predetermined temperature condition.

According to an aspect, there is provided a method for preparing a drive for operation, the drive comprising a component and being connectable to an electrically conductive member, the calibration comprising:

measuring the effect of variations in one or more input parameters on the temperature of the component, at least one of the one or more input parameters being an attribute of the electrically conductive member;

based on the measurements, formulating a model for calculating the temperature of the component using the one or more input parameters;

configuring the drive to operate the model; and configuring the drive such that, if the calculated temperature of the component does not meet a predetermined temperature condition, a command to control the operation of the drive is issued such that the temperature of the component is changed to meet the predetermined temperature condition.

According to an aspect, a method for calculating the temperature of a component is provided. The component is part of a drive configured to drive a motor via a cable. The method comprises:
    determining an attribute of the cable;
    configuring a model to calculate the temperature of the component, the model being configured according to the determined attribute of the cable; and
    using the model to calculate the temperature of the component.

According to an aspect, a method for controlling the operation of a drive is provided. The drive is connectable to a cable. The method comprises:
    obtaining an attribute of the cable;
    using the attribute to determine an operational constraint for the drive; and
    configuring the drive to operate within the constraint when connected to the cable.

According to an aspect, a method for calculating the switching loss of a component of a drive configured to drive a motor via a cable is provided. The method comprises:
    determining an attribute of the cable;
    configuring a model to calculate the switching loss of the component, the model being configured according to the determined attribute of the cable; and
    implementing the model.

According to an aspect, a method for preventing the temperature of a component from exceeding a predetermined value is provided. The component is part of a drive configured to drive a motor via a cable. The method comprises:
    determining an attribute of the cable;
    configuring a model to calculate the temperature of the component, the model being configured according to the determined attribute of the cable;
    using the model to calculate the temperature of the component; and
    if the temperature of the component exceeds the predetermined value, issuing a command to modify the performance of the drive in order to reduce the temperature of the component.

According to an aspect, a method for calibrating a drive for operation is provided. The drive is connectable to a cable. The calibration comprises:
    providing an input value corresponding to an attribute of a cable to which the drive could be connected;
    providing at least one rule for calculating an operational threshold for the drive based on the input value;
    calculating the operational threshold based on the input value in accordance with the rule; and
    storing data representing a relationship between the input value and the calculated operational threshold, wherein the data can be accessed for determination of an operational threshold for the drive based on an attribute of a cable to which the drive is, or will be, connected during operation.

According to an aspect, a drive configured to drive a motor via a cable and configured to carry out a method according to any of the above aspects is provided.

The use of a model enables calculations to be made quickly, enabling real-time calculations of relevant parameters.

The small number of input parameters required reduces the burden on computational resources.

FIGURES

Figure 2:
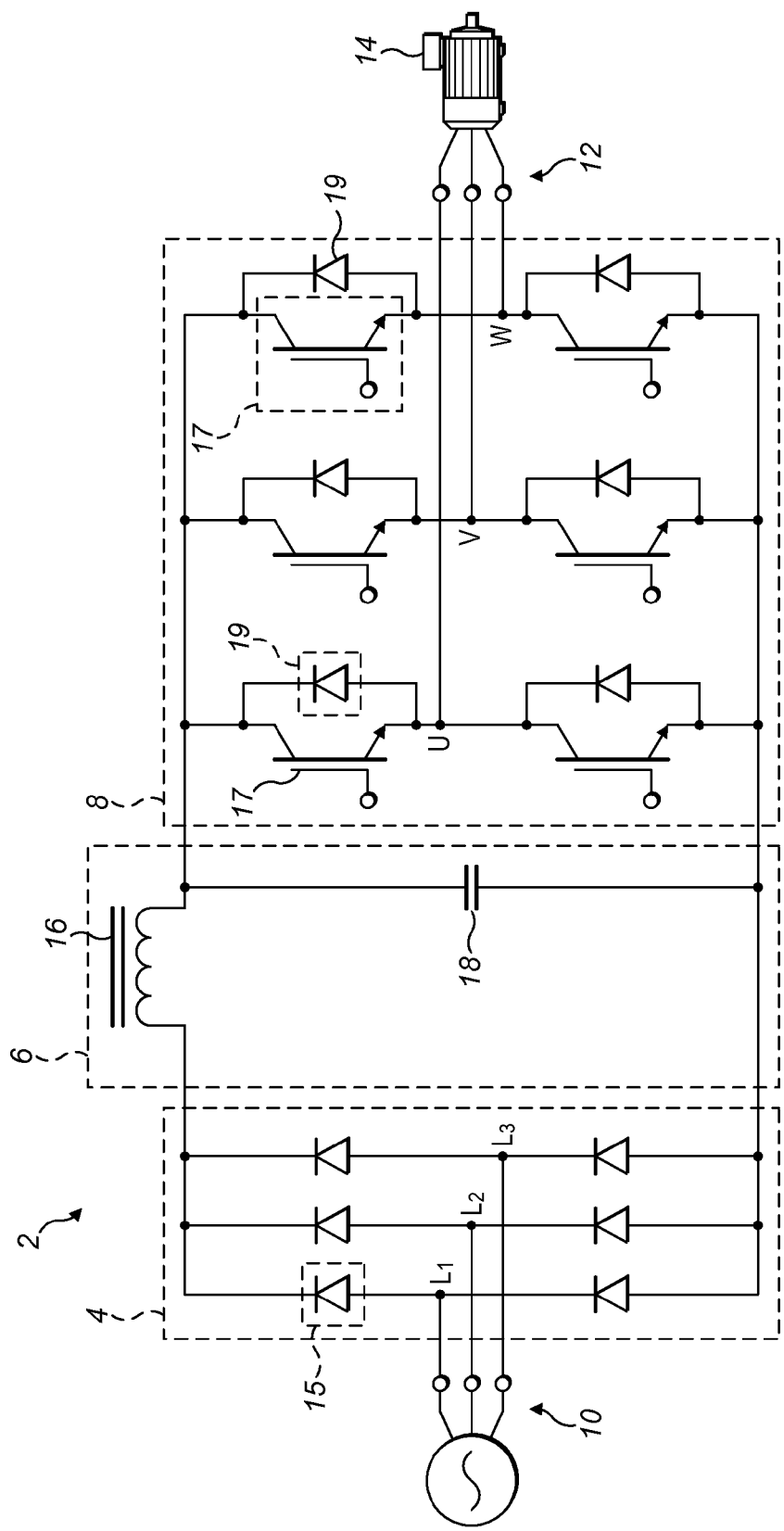
Figure 3:
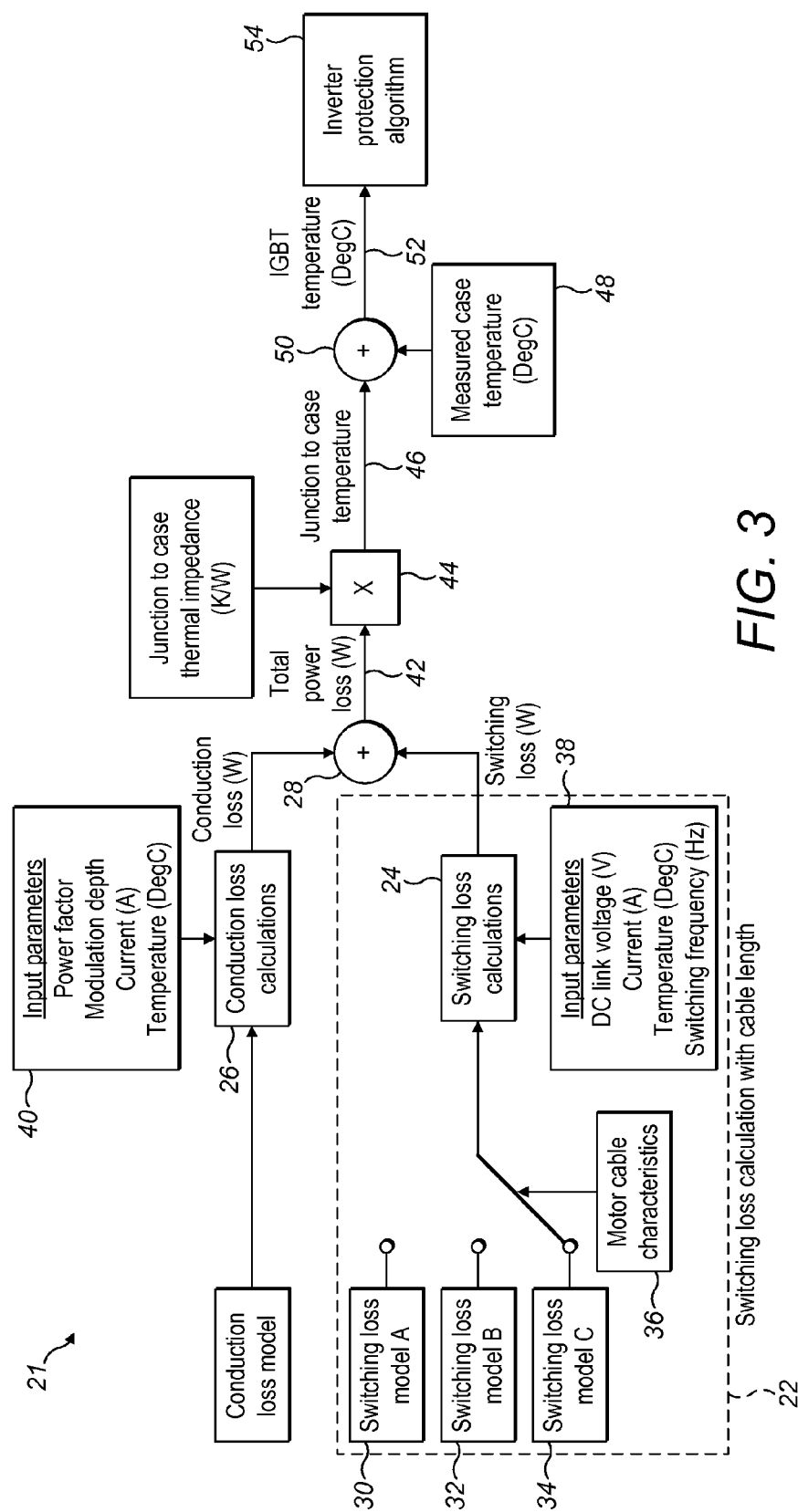
Figure 4B:
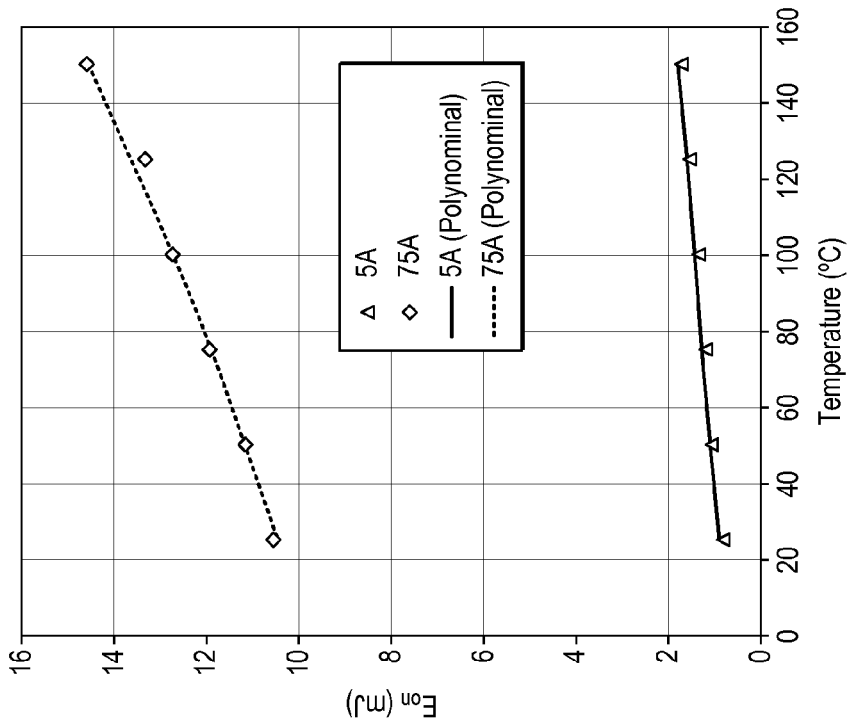
Figure 4A:
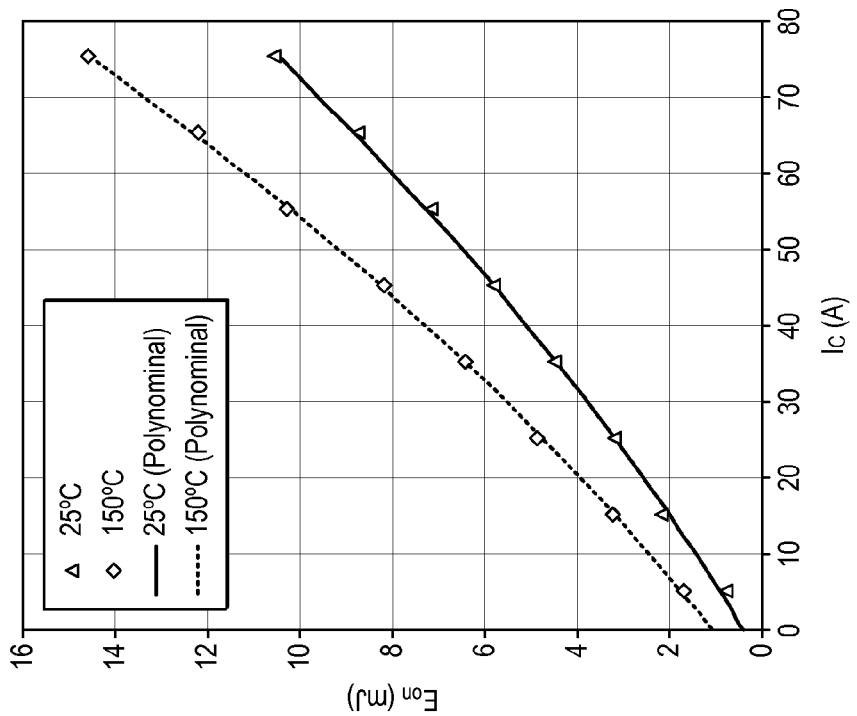

Embodiments are now described by way of example only and with reference to the accompanying drawings, in which:

FIG. 1 is a schematic representation of a drive system;
FIG. 2 is another schematic representation of the drive system;
FIG. 3 is an illustration of the operation of a thermal model; and
FIGS. 4a and 4b are graphs enabling a comparison of measured and curve fitted IGBT switching energy for (a) current and (b) temperature.

OVERVIEW

In overview, a system is provided for use by (or in conjunction with) an inverter drive to calculate and limit the temperature of the inverter. The system takes into account a property of the cable that is actually connected to a drive at a given time (such as its length) and accordingly adapts its calculations so that it does not overly restrict the drive performance. The power rating (and other ratings) for the drive therefore becomes variable, based on this property of the actual motor cable being used, rather than being fixed based on a single (hypothetical) cable with certain properties, such as a fixed length. The system takes into account this variability of cable properties in order to optimise the use of the drive for its actual operating conditions, for example when a relatively short cable is used. This enables the drive rating to be optimised for the given cable conditions, thereby maximising the available output current of the drive while maintaining safety and ensuring the drive remains fully protected.

A switching loss model and/or a conduction loss model can be used to calculate the switching power loss and/or the conduction power loss for the drive, respectively. The calculated loss or losses can be used to determine an operating temperature of a component of the drive. Enough input parameters are used to ensure that the calculation is sufficiently accurate.

DETAILED DESCRIPTION

With reference to FIGS. 1 and 2, a drive 2 comprises a rectifier 4, DC link filter 6 and an inverter 8. The drive 2 is arranged to receive an AC input voltage from a supply cable 10, and to produce an AC output voltage for transmission along a motor cable 12. The motor cable 12 is connected at its other end to a motor 14. The drive 2 is therefore arranged to control the motor 14.

The rectifier 4 comprises a plurality of diodes 15. It receives the AC input voltage from the supply cable 10. The input voltage is three-phase and has a fixed peak voltage and frequency. The filter 6 comprises an inductor 16 and a capacitor 18 and is configured to filter the output of the rectifier 4. Together, the rectifier 4 and the filter 6 convert the AC input voltage into a DC voltage. The DC voltage is subsequently received by the inverter 8. The inverter 8 comprises a plurality of insulated gate bipolar transistors (IGBT) 17, each having an associated anti-parallel freewheeling diode 19 that is arranged to conduct the inductive output current when the IGBT 17 is off. The inverter 8 is configured to convert the DC voltage it receives into a three-phase AC output voltage that is of variable peak voltage and variable frequency. This AC output voltage is transmitted along the motor cable 12 to control the motor 14. The voltage and frequency are made variable by pulse-width modulation, involving rapid switching on and off of the IGBTs 17 in the inverter.

The supply cable 10 and the motor cable 12 are screened and insulated. Each cable has a capacitance that is proportional to its length. The motor cable 12 and the supply cable 10 each has a screen that is connected to ground 20. The charging current in the motor cable 12 is therefore able to return to the inverter 8 via the ground connection of the supply cable 10 and through the rectifier 4 and filter 6 of the drive 2. Other paths for these high frequency currents in the motor cable 12 to return to the drive 2 are also possible.

With reference to FIG. 3, in order to protect the inverter 8 from exceeding a threshold temperature, a thermal model is created that calculates the inverter 8 temperature based on a relevant set of input parameters. The thermal model is created during development of the drive, and is then stored and accessed during operation of the drive, to provide dynamic and accurate ratings for the drive. The process of developing the thermal model can be split into two phases: measurement and modelling. In the measurement phase, the switching power loss of one of the IGBTs 17 in the inverter 8 and its associated diode 19 is measured under various operating conditions, as detailed further below. These measurements are then used to create a power loss model during the modelling phase.

In the measurement phase (which might be regarded as a data collection phase), parameters measured comprise the switching-on energy of the IGBT 17 (referred to as $E_{on}$), the switching-off energy of the IGBT 17 (referred to as $E_{off}$), and the reverse recovery loss of the diode 19 (referred to as $E_{rec}$). These three energy losses are measured during the development of the drive and are measured under various specific operating conditions. The operating conditions to be varied comprise the temperature of the IGBT 17 or diode 19, current, voltage and cable length. The switching energies are measured using an inductive double pulse test circuit, which is a technique for characterising power semiconductors.

The values for $E_{on}$, $E_{off}$ and $E_{rec}$ are the energy losses from one switching event of the IGBT 17 or diodes 19. As will be appreciated by the skilled reader, these values can be converted to power losses by multiplying them by the number of switching events per second, i.e. the switching frequency.

The modelling phase of the thermal model development process comprises making calculations based on the obtained measurements and using those calculations to establish the functional relationships that will define the model. The loss in the IGBT 17 and the diode 19 is calculated in real time. This calculation is divided into two parts: the switching loss and the conduction loss. The switching loss is the loss due to the switching of the device in order to produce the variable voltage and frequency output. The conduction loss is the loss due to the conduction of the output current between these switching events. By using interpolation, these losses can be estimated directly from measured values taken over the full range of the measured parameters. However, this would create large amounts of input data. The amount of processing power and storage space required is reduced as disclosed herein.

In order to calculate the power loss, the measured switching loss and on-state voltage are represented by a polynomial expression with 12 coefficients. A series of polynomial expressions are used to estimate the loss parameters for the IGBTs 17 and the diodes 19 in the inverter, which are then used to estimate the total power loss in the inverter.

The steps used to calculate the coefficients for the IGBT turn-on energy ($E_{on}$) are described below. A similar approach is used to calculate the coefficients for the other switching and conduction loss parameters and will not be repeated in detail for the sake of brevity.

The loss models used in the thermal model are developed in three stages. At each stage an additional dependency is incorporated into the model, i.e. the operating current ($I_C$) (the output current of the inverter 8), the temperature ($T_j$) of the IGBT 17 (dependent on the switching energy $E_{on}$ and $E_{off}$) or diode 19 (dependent on the switching energy $E_{rec}$) in the inverter 8 and the rectified DC link voltage ($V_{DC}$). (To generate the model for $E_{on}$ and $E_{off}$, the temperature of the IGBT 17 is used, and to generate the model for $E_{rec}$, the temperature of the diode 19 is used.)

The calculations that are performed in each stage are described below for $E_{on}$ for a specific example of an inverter module, but it will be appreciated that they can be applied to other inverters. These calculations are based on an inverter module with a rated current of 75 A, a maximum operating temperature of 150° C. and a maximum DC link voltage of 800 V.

In the first stage, the second order polynomial:

$$E_{on}(I_C) = k_1 \cdot I_C^2 + k_2 \cdot I_C + k_3 \text{ [mJ]} \quad (1.1)$$

is curve fitted (using the method of least squares) to the switching-on energy $E_{on}$ measured over the full range of operating current ($I_C$=0 A to 75 A) and a range of temperatures and voltages, for this example at the following temperatures and voltage:

Device temperatures of 25° C. and 150° C.

DC link voltage of 600 V.

With reference to FIGS. 4a and 4b, a comparison of the measured and curve fitted switching energy for (a) current and (b) temperature shows that, for the selected operating conditions, the second order polynomial provides a good approximation of the measured switching energy.

The coefficients in Equation 1.1 can only be used to estimate the switching energy in the selected operating conditions, i.e. with a fixed temperature and voltage. Additional stages enable the development of a more comprehensive power loss model, and these are now described.

The second stage in the development of the power loss model is to incorporate the behaviour of the device temperature (i.e. the temperature of whichever of the IGBT 17 or the diode 19 that the loss model is being developed to estimate). To achieve this, the coefficients in Equation 1.1 are themselves each represented by a second order polynomial:

$$k_1 = k_{11} \cdot T_j^2 + k_{12} \cdot T_j + k_{13} \text{ [mJ/A}^2\text{]} \quad (1.2)$$

$$k_2 = k_{21} \cdot T_j^2 + k_{22} \cdot T_j + k_{23} \text{ [mJ/A]} \quad (1.3)$$

$$k_3 = k_{31} \cdot T_j^2 + k_{32} \cdot T_j + k_{33} \text{ [mJ]} \quad (1.4)$$

These coefficients are calculated by substituting the three equations shown above into Equation 1.1. The resultant equation is then curve fitted to the switching energy measured up to the maximum operating temperature of the device ($T_j$=25° C. to 150° C.) and in this stage, a range of currents and voltages, for this example the following currents and voltage:

Device currents of 5 A and 75 A

DC link voltage of 600 V.

In order to maintain the characteristics of the model developed in stage 1, the coefficients are calculated to ensure that when operating at a device temperature of 25° C. or 150° C., the calculated values of $k_1$, $k_2$ and $k_3$ are the same as the coefficients calculated for Equation 1.1.

The polynomial expression provides a good approximation of the switching energy under the defined operating conditions. By using the coefficients calculated in this stage the switching energy can be estimated at any current or temperature.

The third and final stage in this development is to incorporate the effect of the DC link voltage. The change in the switching energy due to a change in voltage is modelled by:

$$k_V = k_{V1} \cdot V_{Dc}^2 + k_{V2} \cdot V_{DC} + k_{V3} \quad (1.5)$$

Combining this equation with those defined in stage 2 allows the switching energy at any current, temperature or voltage to be calculated:

$$E_{on}(I_C, T_j, V_{DC}) = E_{on}(I_C, T_j) \cdot k_V = (k_1 I_C^2 + k_2 \cdot I_C + k_3) \cdot k_V \text{ [mJ]} \quad (1.6)$$

The coefficients are calculated by curve fitting Equation 1.6 (using the coefficients calculated for Equations 1.2 to 1.4) to the switching energy measured over the full range of DC link voltage ($V_{DC}$=500 V to 800 V) and a range of current and temperature, for this example at the following currents and temperature:

Device current of 5 A and 75 A
Device temperature of 150° C.

As a result of this curve fitting, a power loss model for the drive is created. This can be stored and used during operation of the drive.

The power loss model developed in this section (Equation 1.6) enables the IGBT turn-on energy to be estimated at any current, temperature or voltage. This expression only requires 12 coefficients. To show the behaviour of the switching energy, the complete power loss model is used to estimate the turn-on energy over the full range of operating current and temperature. As discussed, the approach outlined in this section can also be used to calculate the coefficients for other loss parameters. The loss parameters comprise:

IGBT turn-on energy loss ($E_{on}$),
IGBT turn-off energy loss ($E_{off}$),
Diode turn-off energy loss ($E_{rec}$),
IGBT on-state (forward) voltage ($V_{CE}$), and
Diode on-state (forward) voltage ($V_F$).

A power loss model is developed for each of these parameters.

In summary, the power loss model is created by taking measurements of different parameters with the inverter operating under various operating conditions, i.e. over a range of voltages, temperatures and currents. These measurements are used to produce a map of $E_{on}$ etc. under each combination of conditions. The model is used to calculate the measured parameter without the need to store all of the measurements at each point. These parameters, along with the switching frequency of the IGBT 17 (i.e. the number of switching events per second, which the drive 2 is able to set itself), are used as input parameters for the switching loss calculation.

Typically, the switching-on power loss of the IGBT 17 is significantly affected by the cable charging current. $E_{on}$ increases as the cable length increases.

Once the measurements have been made and the parameters for the power loss model have been calculated, the model is ready to be used in the drive 2. The power loss models are used to calculate the total power loss in a device (IGBT 17 or diode 19) under the real-time operating conditions measured by the drive, which are inputs to the model. This total power loss generated in a device is used with the known thermal impedance and measured case temperature (i.e. the temperature of the case of the inverter 8 module) to calculate the absolute temperature of the inverter devices, and this is used to protect the drive 2 by ensuring that the temperature does not exceed a certain threshold. If the temperature exceeds the maximum threshold the drive will take appropriate action to prevent the inverter being damaged. This can include the restriction of the operating parameters that have an influence on the power loss, or turning the inverter off.

The model creation described above is carried out using a cable of a given length. After this model has been created, a second model is created in the same way, but with a cable of a different length. Any number of switching loss models (and other types of models) is created based on different lengths and characteristics of cable. This essentially calibrates the drive 2, so that it can operate accurately and safely with a range of cables (of different lengths and characteristics) connected thereto. In use, the drive then uses an appropriate model for its instantaneous operating conditions when connected to a cable of a particular length.

In use, the length and/or other characteristics of the cable 12 can be matched to the drive 2 for a set of operating conditions. For example, the user can input data corresponding to the length of the cable 12. Alternatively, the actual tolerable operating conditions can be determined for a given drive and set of cables. The calculated temperature of the inverter 8 is therefore accurately determined, as the cable length has been taken into account.

Referring again to FIG. 3, a thermal model 21 for calculating the temperature of the inverter 8 is described. A switching loss calculation 22, 24 is combined with a conduction loss calculation 26 at an adder 28. These are calculations carried out with respect to a particular device in the inverter 8. The switching loss calculation 22 involves the selection of a switching loss model from a plurality of such models. In this embodiment, there are three of these models, model A 30, model B 32 and model C 34. The particular model is selected based on motor cable characteristics 36. In this embodiment the characteristic is the length of the cable. Once the model has been selected, input parameters 38 are introduced into the model and switching loss calculations 24 take place as described above. In this embodiment, the input parameters are the DC link voltage, the current, the temperature and the switching frequency. Conduction loss calculations 26 receive input parameters 40 which, in this embodiment, are the power factor, the modulation depth, the current and the temperature. The conduction loss calculations 26 also take place as described above.

Once the calculated switching loss 24 and the calculated conduction loss 26 have been combined at the adder 28, a total power loss 42 of the device (IGBT 17 or diode 19) is calculated and provided to multiplier 44, at which the total power loss (in Watts) is multiplied by the thermal impedance (units of K/W) between the junction and the case of the inverter 8 module to calculate a temperature difference 46. (The "junction" is the part of a semi-conductor that must be kept below the specified temperature.) The calculated temperature difference 46 is the difference (i.e. increase) in temperature between the device and the case. The temperature of the case 48 is measured and is used as a reference value and added to the calculated temperature 46 at adder 50 to calculate the temperature 52 of the device. This temperature value is then provided to an inverter protection algorithm 54, which acts to ensure that the temperature of the IGBT 17 does not exceed a predetermined threshold value, which is the maximum operating temperature of the device. This can be achieved by turning the inverter 8 off when the threshold temperature is exceeded.

When a shorter cable is used, the actual power loss is lower and therefore the temperature of the device is lower. The output current, switching frequency or voltage can therefore be increased with the temperature of the device still remaining below the threshold.

It will be understood that the above description of specific embodiments is by way of example only and it is not intended to limit the scope of the present disclosure. Many modifications of the described embodiments, some of which are now described, are envisaged and intended to be within the scope of the present disclosure.

In some embodiments, instead of a plurality of separate models being created, each corresponding to a different length of motor cable 12, a single model is created in which the length of the cable is provided as an input parameter in a similar manner to the other input parameters referred to above. The model therefore has a continuous relationship with the length of the cable, ensuring that a small change in cable length will result in a different output of the model, thus ensuring that the model is well suited to the particular cable being used with the drive at any given time.

In some embodiments, different input parameters and/or a subset of the input parameters referred to above are used. In some embodiments, approximations of the loss models described above are made by assuming one or more parameters are constant. In some embodiments, the effect of temperature is ignored and it is assumed that the temperature is at a maximum. In some embodiments, the power factor is considered constant for the conduction loss calculation.

In some embodiments, the property of the cable considered by the model is a property other than the length of the cable, such as the capacitance of the cable. In some embodiments, the model is configured to receive a user input of the type of cable being used, and the model is configured to retrieve information about this type of cable (from e.g. a database or the internet) in response to this and adapt the model accordingly.

In the embodiments described above, insulated gate bipolar transistors (IGBT) are used. In some embodiments another kind of transistor or other switching device is used as well or instead.

In some embodiments, the conduction loss model is not used and therefore only the switching loss model is used. In some embodiments, the switching loss model is not used and therefore only the conduction loss model is used.

In the embodiments described above, the conduction loss model does not use any cable characteristics as an input parameter, as the effect of the cable characteristics on the conduction loss model is not usually significant. In some embodiments, the conduction loss model does use a cable characteristic in a similar manner to the switching loss model.

In some embodiments, only a subset of the switching-on energy of the IGBT (referred to as $E_{on}$), the switching-off energy of the IGBT (referred to as $E_{off}$), and the reverse recovery loss of the diode (referred to as $E_{rec}$) are measured in the measurement phase and subsequently used in the modelling phase.

In some embodiments, the above disclosure is applied to a parameter other than temperature, i.e. the model calculates another parameter of the component and is used in controlling the device accordingly.

While specific values and ranges have been used in the section above relating to the development of the model, these are illustrative and not intended to be limiting. Other values and ranges may be used.

The drive can be used to control various types of motor in various applications, including, but not limited to, elevators, conveyor belts, cranes, fans and pumps.

The invention claimed is:

1. A method for controlling the temperature of a component in an inverter, the inverter being part of a drive configured to drive an electrical machine via an electrically conductive member, the method comprising:
    determining a value of an attribute of the electrically conductive member;
    configuring a model to calculate the temperature of the component in the inverter, the model being configured based on the determined value of the attribute of the electrically conductive member;
    using the model to calculate the temperature of the component in the inverter; and
    if the calculated temperature of the component in the inverter does not meet a predetermined temperature condition, issuing a command to control the operation of the drive such that the temperature of the component in the inverter is changed to meet the predetermined temperature condition.

2. A method as claimed in claim 1, wherein configuring the model comprises selecting the model from a plurality of different models each associated with a different possible value of the attribute of the electrically conductive member.

3. A method as claimed in claim 1, wherein configuring the model comprises providing the determined value of the attribute of the electrically conductive member as an input parameter of the model.

4. A method as claimed in claim 1, wherein the predetermined temperature condition corresponds to a range of temperatures.

5. A method as claimed in claim 4, wherein the range of temperatures comprises a predetermined safe operating range of temperatures for the component in the inverter.

6. A method as claimed in claim 1, wherein the predetermined temperature condition is not met when the calculated temperature of the component in the inverter exceeds a predetermined threshold value, and the condition is met when the calculated temperature of the component in the inverter is below the threshold value.

7. A method as claimed in claim 1, wherein the value of the attribute is determined from a user input.

8. A method as claimed in claim 1, wherein the attribute is the capacitance of the electrically conductive member.

9. A method as claimed in claim 1, wherein the attribute is the length of the electrically conductive member.

10. A method as claimed in claim 1, wherein the model uses one or more input parameters to calculate the temperature of the component in the inverter.

11. A method as claimed in claim 10, wherein a measurement of a DC link voltage is one of the one or more input parameters.

12. A method as claimed in claim 10, wherein a measurement of a current is one of the one or more input parameters.

13. A method as claimed in claim 10, wherein a measurement of a temperature is one of the one or more input parameters.

14. A method as claimed in claim 10, wherein a switching frequency is one of the one or more input parameters.

15. A method as claimed in claim 10, wherein a power factor is one of the one or more input parameters.

16. A method as claimed in claim 10, wherein the model contains data indicative of the effect of each of the one or more input parameters, individually or in combination, on the temperature of the component in the inverter.

17. A method as claimed in claim 10, wherein the input parameters are updated while the drive is in use and the model is used to calculate an updated temperature of the component in the inverter.

18. A method as claimed in claim 1, wherein the model calculates a temperature difference between the component in the inverter and a reference temperature.

19. A method as claimed in claim 1, wherein the model calculates a switching loss of the component in the inverter.

20. A method as claimed in claim 1, wherein the model calculates a power loss of the component in the inverter.

21. A method as claimed in claim 1, wherein the component is a transistor in the inverter of the drive or a diode associated with a transistor in the inverter.

22. A method as claimed in claim 1, wherein the drive operates using pulse-width modulation, and the issuing of a command to control the operation of the drive comprises issuing a command to alter a pulse-width modulation signal.

23. A method as claimed in claim 1, wherein the electrical machine is a motor.

24. A method as claimed in claim 1, wherein the electrically conductive member is a cable.

25. A method for preparing a drive for operation, the drive comprising a component in an inverter, the drive being connectable to an electrically conductive member, the method comprising:
- measuring the effect of variations in one or more input parameters on the temperature of the component in the inverter, at least one of the one or more input parameters being an attribute of the electrically conductive member;
- based on the measurements, formulating a model for calculating the temperature of the component in the inverter using the one or more input parameters;
- configuring the drive to operate the model; and
- configuring the drive such that, if the calculated temperature of the component in the inverter does not meet a predetermined temperature condition, a command to control the operation of the drive is issued such that the temperature of the component in the inverter is changed to meet the predetermined temperature condition.

26. A method as claimed in claim 25, wherein the attribute of the electrically conductive member is the length of the electrically conductive member.

27. A drive configured to control the temperature of a component in the inverter, the inverter being part of the drive, the drive being configured to drive an electrical machine via an electrically conductive member, the drive being configured to:
- determine a value of an attribute of the electrically conductive member;
- configure a model to calculate the temperature of the component in the inverter, the model being configured based on the determined value of the attribute of the electrically conductive member;
- use the model to calculate the temperature of the component in the inverter; and
- if the calculated temperature of the component in the inverter does not meet a predetermined temperature condition, issue a command to control the operation of the drive such that the temperature of the component in the inverter is changed to meet the predetermined temperature condition.

28. A drive configured to drive an electrical machine via an electrically conductive member and configured to carry out a method according to claim 1.

* * * * *